United States Patent
Keating et al.

(10) Patent No.: US 8,725,171 B2
(45) Date of Patent: May 13, 2014

(54) SYSTEM AND METHOD OF PROVIDING MODE CHANGES TO WIRELESS DEVICES

(75) Inventors: Virgina Walker Keating, San Diego, CA (US); Michael Barboni, San Marcos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 871 days.

(21) Appl. No.: 12/204,035

(22) Filed: Sep. 4, 2008

(65) Prior Publication Data

US 2010/0056124 A1    Mar. 4, 2010

(51) Int. Cl.
*H04W 24/00* (2009.01)

(52) U.S. Cl.
USPC .............. 455/456.3; 455/456.1; 455/456.2; 455/456.4; 455/457; 455/414.2

(58) Field of Classification Search
USPC .............. 455/456.1–456.4, 435.1, 415, 456.6
See application file for complete search history.

(56) References Cited

U.S. PATENT DOCUMENTS

| | | | |
|---|---|---|---|
| 6,205,326 B1 * | 3/2001 | Tell et al. | 455/406 |
| 6,701,144 B2 | 3/2004 | Kirbas et al. | |
| 6,895,237 B1 | 5/2005 | Scott | |
| 6,973,333 B1 | 12/2005 | O'Neil | |
| 7,076,255 B2 | 7/2006 | Parupudi et al. | |
| 7,209,705 B2 * | 4/2007 | Moles et al. | 455/41.2 |
| 7,409,233 B2 * | 8/2008 | Pritchard | 455/567 |
| 7,551,930 B2 * | 6/2009 | Lempiö et al. | 455/456.3 |
| 7,590,415 B2 * | 9/2009 | Tijerino | 455/414.3 |
| 7,668,557 B2 | 2/2010 | Hong et al. | |
| 7,715,835 B1 * | 5/2010 | Karnik | 455/420 |
| 7,835,730 B2 * | 11/2010 | Boss et al. | 455/419 |
| 8,024,011 B2 * | 9/2011 | Yeh | 455/567 |
| RE42,997 E * | 12/2011 | Wullert, II | 379/88.23 |
| 8,204,536 B2 * | 6/2012 | Franklin et al. | 455/550.1 |
| 2002/0090953 A1 * | 7/2002 | Aburai et al. | 455/456 |
| 2003/0207683 A1 * | 11/2003 | Lempio et al. | 455/422.1 |
| 2005/0058067 A1 | 3/2005 | Chmaytelli et al. | |
| 2005/0181808 A1 * | 8/2005 | Vaudreuil | 455/456.3 |
| 2005/0272445 A1 * | 12/2005 | Zellner | 455/456.2 |
| 2006/0099967 A1 * | 5/2006 | Colvin et al. | 455/456.4 |
| 2006/0258385 A1 * | 11/2006 | Hovestadt | 455/520 |
| 2007/0037566 A1 * | 2/2007 | D'Agostino et al. | 455/421 |
| 2007/0072598 A1 * | 3/2007 | Coleman et al. | 455/422.1 |
| 2007/0249366 A1 * | 10/2007 | Thomson et al. | 455/456.1 |
| 2008/0057945 A1 * | 3/2008 | Hong et al. | 455/425 |

(Continued)

FOREIGN PATENT DOCUMENTS

| | | |
|---|---|---|
| EP | 0876071 A1 | 11/1998 |
| EP | 1139684 A1 | 10/2001 |
| EP | 1180902 A1 | 2/2002 |
| EP | 1361766 A2 | 11/2003 |
| JP | 11004295 A | 1/1999 |

(Continued)

OTHER PUBLICATIONS

International Search Report and the Written Opinion—PCT/US2009/055077 International Search Authority—European Patent Office—Dec. 11, 2009.

*Primary Examiner* — Kashif Siddiqui
*Assistant Examiner* — Mong-Thuy Tran
(74) *Attorney, Agent, or Firm* — Fariba Yadegar-Bandari (57) ABSTRACT

A method of providing mode changes to wireless devices is provided. The method may include receiving a request from a wireless device to connect with a network device and sending a signal to the wireless device to enter a location defined mode.

45 Claims, 7 Drawing Sheets

(56) References Cited

U.S. PATENT DOCUMENTS

| | | |
|---|---|---|
| 2008/0188206 A1* | 8/2008 | Pirzada et al. ............ 455/414.1 |
| 2009/0005061 A1* | 1/2009 | Ward et al. ................ 455/456.1 |
| 2009/0170532 A1* | 7/2009 | Lee et al. .................. 455/456.3 |
| 2009/0181716 A1* | 7/2009 | Benco et al. ............... 455/550.1 |
| 2010/0066507 A1* | 3/2010 | Myllymaki ................. 340/10.4 |
| 2010/0227587 A1* | 9/2010 | Ohmoto ....................... 455/411 |

FOREIGN PATENT DOCUMENTS

| | | |
|---|---|---|
| JP | 2003333052 A | 11/2003 |
| JP | 2008515309 A | 5/2008 |
| WO | WO9926428 A1 | 5/1999 |
| WO | WO0065865 A1 | 11/2000 |
| WO | WO2006035231 | 4/2006 |
| WO | WO2008070690 | 6/2008 |
| WO | WO2008092855 | 8/2008 |

* cited by examiner

SYSTEM AND METHOD OF PROVIDING MODE CHANGES TO WIRELESS DEVICES

BACKGROUND

The present disclosure generally relates to the operation of wireless devices, and more particularly, to systems and methods of changing operation modes of wireless devices.

Wireless devices, for example, cell phones, portable data assistants, text devices, lap top computers, etc., are ubiquitous. Most users of such devices take at least one such device with them everywhere. The settings and the personalized content, e.g., wallpaper, screen saver, display background, etc., are associated with these devices can be static and remain the same in all situations. Unfortunately, the content and the settings of a particular device may not always be appropriate for all locations. Accordingly, a user of such a device may have to manually change the device settings based on the location. A user may have to change the device settings for a location (e.g., work) and reset, or otherwise change, the device settings for another location (e.g., home).

Accordingly, there is a need for a system and method, or methods, to address the above shortcomings.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A method of providing mode changes to wireless devices is provided, according to one aspect. The method may include receiving a request from a wireless device to connect with a peer or an infrastructure network device and sending a signal to the wireless device to enter a location defined mode.

In another aspect of the present disclosure, a device for providing access to a network is provided. The device may include means for receiving a request from a wireless device to connect with a peer or an infrastructure network device and means for sending a signal to the wireless device to enter a location defined mode.

In still another aspect of the present disclosure, a computer program product including a computer-readable medium is provided. The computer-readable medium may include at least one instruction for receiving a request from a wireless device to connect with a peer or an infrastructure network device and at least one instruction for sending a signal to the wireless device to enter a location defined mode.

In yet another aspect of the present disclosure, a device for providing access to a network is provided. The device may include a processor and a memory that is accessible to the processor. The memory may include at least one instruction for receiving a request from a wireless device to connect with a pear or an infrastructure network device and at least one instruction for sending a signal to the wireless device to enter a location defined mode.

In another aspect of the present disclosure, a method of receiving mode changes at a wireless device is provided. The method may include attempting to connect with a peer or an infrastructure network device, receiving a signal to enter a location defined mode via the network device, and prompting a user to accept the location defined mode.

In still another aspect of the present disclosure, a wireless device is provided. The wireless device may include means for attempting to connect with a peer or an infrastructure network device, means for receiving a signal to enter a location defined mode via the network device, and means for prompting a user to accept the location defined mode.

In yet another aspect of the present disclosure, a computer program product including a computer-readable medium is provided. The computer-readable medium may include at least one instruction for attempting to connect with a peer or an infrastructure network device, at least one instruction for receiving a signal to enter a location defined mode via the network device, and at least one instruction for prompting a user to accept the location defined mode.

In another aspect of the present disclosure, a wireless device having a processor and a memory accessible to the processor is provided. The memory may include at least one instruction for attempting to connect with a peer or an infrastructure network device, at least one instruction for receiving a signal to enter a location defined mode via the network device, and at least one instruction for prompting a user to accept the location defined mode.

In still another aspect of the present disclosure, a method of receiving mode changes at a wireless device is provided. The method may include receiving a location identifier and searching a location identifier table to find a location defined mode associated with the location identifier.

In yet another aspect of the present disclosure, a wireless device is provided. The wireless device may include means for receiving a location identifier and means for searching a location identifier table to find a location defined mode associated with the location identifier.

In another aspect of the present disclosure, a computer program product including a computer-readable medium is provided. The computer-readable medium may include at least one instruction for receiving a location identifier and at least one instruction for searching a location identifier table to find a location defined mode associated with the location identifier.

In another aspect of the present disclosure, a wireless device having a processor and a memory accessible to the processor is provided. The memory may include at least one instruction for receiving a location identifier and at least one instruction for searching a location identifier table to find a location defined mode associated with the location identifier.

In yet another aspect of the present disclosure, a wireless device is provided and may include a messaging unit. The messaging unit may be configured to communicate location information to a position definition service. Further, the messaging unit may be configured to receive at least one location defined modes from the position definition service at least partially based on the location information.

BRIEF DESCRIPTION OF THE DRAWINGS

In the figures, like reference numerals refer to like parts throughout the various views unless otherwise indicated.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more aspects.

In this description, the term "application" may also include files having executable content, such as object code, scripts, byte code, markup language files, and patches, etc. In addition, an "application" referred to herein, may also include files that are not executable in nature, such as documents that may need to be opened or other data files that need to be accessed.

The term "content" may also include files having executable content, such as object code, scripts, byte code, markup language files, and patches. In addition, an "content" referred to herein, may also include files that are not executable in nature, such as documents that may need to be opened or other data files that need to be accessed.

In this description, the terms "communication device," "wireless device," and "wireless communications device," are used interchangeably. With the advent of third generation (3G) wireless technology, more bandwidth availability has enabled more electronic devices with wireless capabilities. Therefore, in a non-limiting aspect, a wireless device could be a cellular telephone, a pager, a PDA, a smartphone, a navigation device, a computer with a wireless connection, or any other mobile device with a processor, a memory, and a wireless network interface.

Figure 1:
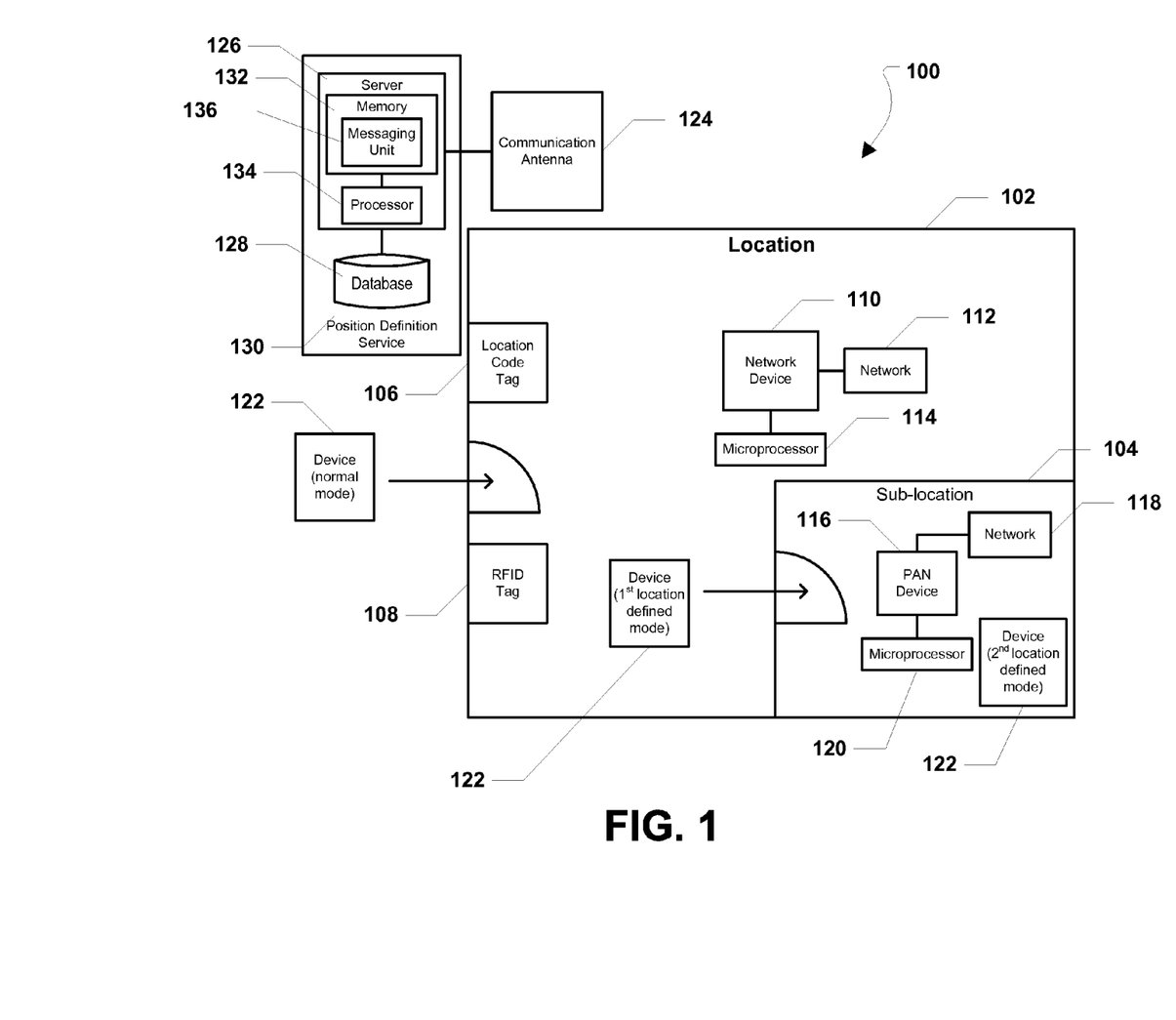
FIG. 1 is a diagram of a system for providing mode changes to wireless devices, according to one aspect.

Referring initially to FIG. 1, in accordance to tone aspect, a system for providing mode changes to wireless devices is shown and is generally designated 100. As shown, the system 100 may include a location 102 and a sub-location 104 within the location 102. For example, the location 102 may be an office, a house, business, a group of business locations, any other building, or group of buildings, a designated area, or a combination thereof. A location 102 may also include a park, an open-air amphitheater, or a combination thereof. Further, the location 102 may be an airplane, a bus, a rail car, an automobile, a tractor trailer, or other transit machine. The sub-location 104 may be a room within the location 102, e.g., a bedroom, a home office, a study, a den, a library, etc. As intended herein, the location 102 may not be stationary and relative locations, e.g., centered on a central point with a radius, may travel with the location 102. For example, a location may be established around a police car, and in the presence of the police car, certain settings associated with a civilian vehicle may be pushed to the civilian vehicle. For example, an instruction to lower the volume of a radio or tune to a particular FM station to hear instructions from the officer may be pushed to the civilian vehicle by the police car. Moreover, in the event of a high speed chase the police car may push an instruction to shut down the civilian vehicle in order to prevent the civilian vehicle from any further attempt to evade the police car and endanger innocent bystanders.

As indicated in FIG. 1, the system 100 may include at least one location code tag 106 that may be placed within the location 102. Particularly, the location code tag 106 may be placed near an entrance into the location 102. The location code tag 106 may be a bar code, a hologram, a room number, a sign, a particular physical feature, or some other visual indicator that may be recognized by the wireless device 122, e.g., through a bar code reader, a hologram reader, a camera, a similar device, etc., or a combination thereof. The system 100 may also include at least one RFID tag 108 that may be positioned, or otherwise placed, near the entrance of the location 102. In a particular aspect, the RFID tag 108 may be an active RFID tag, a passive RFID tag, or a combination of both. As described in greater detail below, the location code tag 106, the RFID tag 108, or a combination of both, may be used to trigger mode changes within a wireless device that recognizes the location code tag 106 or the RFID tag 108.

FIG. 1 shows that the system 100 may also include a network device 100, e.g., a peer network device, an infrastructure network device, or a combination thereof, that may provide access to a network 112, e.g., the Internet, etc. The network device 110 may be located inside the location 102. Moreover, the system 114 may include a first microprocessor 114 that may be connected to the network device 110. The system 100 may include a personal area network (PAN) device 116 that may provide access to a personal area network 118. Also, a second microprocessor 120 may be connected to the PAN device 116.

As illustrated in FIG. 1, the system 100 may include a wireless device 122. The wireless device 122 may communicate with a wireless network via a communication antenna 124. The communication antenna 124 may be connected to a server 126 that, in turn, may be connected to a database 128. The server 126 and the database 128 may be part of a position definition service 130. The server 126 may include a memory 132 and a processor 134 that is accessible to the memory 132. Further, the server 126 may include a messaging unit 136 located within the memory 132 and may be accessible to the processor 134 within the server 126. The messaging unit 136 may communicate with a corresponding messaging unit location within the wireless device 122. The messaging unit is described in more detail below.

In a particular aspect, the position definition service 130 may include community-defined information about various location genres that may allow for intelligent automatic settings in more numerous and varied locations. The position definition service 130 may be used by three types of users. These users may include wireless device users that have a desire to retrieve or subscribe to information, wireless device users or web users that have a desire to populate their information, and users that have a desire to define automatic configurations for particular locations.

For the first type of user, a messaging unit, described in detail below, within the wireless device may communicate via an over-the-air interface to the position definition service 130. The position definition service 130 may receive latitude/longitude information and return appropriate zone membership details, actions available, and whether those actions are optional or mandatory.

For the second type of users, the position definition service 130 may receive the latitude/longitude information from the messaging unit within a wireless device that the user has specified to be shared, process the information against defined zones and genres within the position definition service 130 to avoid duplication, and return an acknowledgement. Similarly, the position definition service 130 is capable of receiving and processing the same information via an input/output interface and software to allow for configuration by a user via a website. The zones may include a group of locations and may be set by a user. For example, the user may transmit coordinates that define the perimeter, or boundary, of particular zones. Alternatively, the user may transmit addresses that correspond to particular locations and genres or behaviors associated with the particular addresses.

The third type of users, i.e., owners of locations looking to offer patrons pre-defined settings in an optional or mandatory state, may have access to configure zones and actions within those zones through an input/output interface and software of the position definition service 130.

It is to be understood that the mandatory push of actions to wireless devices may require legislative intervention. The resulting laws would likely establish the methods for owner location authentication and authorization. Pre-defined genres may be made available for use when configuring such mandatory pushes and these pre-defined genres may be compatible with content classification systems as necessary to properly associated different types of content and actions with different locations and genres. As described in detail below, genre updates may also be synced with the wireless device along with other information necessary to update and enhance the ability for a situation awareness unit within the wireless device to function. In addition to the actions defined by the position definition service 130, a user may also define preferences for actions to be taken when encountering various locations.

In a particular aspect, when the wireless device 122 is located external to the location 102, the wireless device 122 may be operating in a normal mode. The normal mode may provide the full functionality of the wireless device 122, e.g., normal ring tone, full acceptance of calls, full use of text messaging, fully use of email, etc.

However, when the wireless device 122 is moved into the location 102, the wireless device 122 may be asked, or forced via an override instruction, to change to a first location defined mode.

The mode change may be initiated upon the wireless device 122 initiating contact with the Network device 110. For example, when the wireless device 122 is brought into the location 102, the wireless device 122, via a network card, may automatically attempt to connect to the Network device 110. During a handshake process between the Network device 110 and the wireless device 122, the wireless device 122 may be instructed by the Network device 110, or the first microprocessor 114 connected thereto, to enter into the first location defined mode. In other words, the wireless device 122 may switch from a device defined mode to the location defined mode. The system 100 may be configured so that the if the wireless device 122 does not comply with the instruction to enter the first location defined mode, the wireless device 122 may be denied access to the network 112 by the Network device 110. In other words, in order to access the network 112 via the Network device 110, the wireless device 122 may have to accept the mode change from the normal mode to the first location defined mode. In the event that the wireless device 122 enters a restricted location, e.g., due to government regulations or business rules related to trade secrets, the wireless device 122 may receive a remote signal to disable the camera. If the wireless device 122 refuses to disable the camera, software accessible to the network device 110 may be configured to alert a physical security officer so that the security officer may confiscate the device.

In another aspect, the mode change may be initiated upon recognition of the location code tag 106 or the RFID tag 108. In other words, upon entering the location 102, a user may take a picture of the location code tag 106 using the wireless device 122. The wireless device 122 may compare the picture of the location code tag 106 to an internal table, or use some other method for location code recognition, and after successfully recognizing the location code tag 106, the wireless device 122 may change from the normal mode to the first location defined mode that is associated with the location code tag 106. In the case of the RFID tag 108, when the wireless device 122 is within range of the RFID tag 108 and is able to recognize the RFID tag 108, the RFID tag 108 may include a code that may be compared to a table of codes in order to locate an instruction to change from the normal mode to the first location defined mode. Otherwise, the RFID tag 108 may simply transmit the instruction to the wireless device 122 after the wireless device 122 recognizes the RFID tag 108. It may be appreciated that location proximity may also be determined by a peer device or the network device 110.

As depicted in FIG. 1, when the wireless device 122 enters the sub-location 104 within the location 102, the wireless device 122 may be further instructed to move from the first location defined mode to a second location defined mode. This move may be based on another location code tag (not shown) or another RFID tag (not shown) that may be placed at or near the entrance into the sub-location 104.

Alternatively, the mode change may be initiated upon the wireless device 122 initiating contact with the PAN device 116. For example, when the wireless device 122 is moved into the sub-location 104, the wireless device 122, via a network card, may automatically attempt to connect to the PAN device 116. During the initial communication with the PAN device 116, the wireless device 122 may be instructed by the PAN device 116, or the second microprocessor 120 connected thereto, to enter into the second location defined mode. The system 100 may be configured so that the if the wireless device 122 does not comply with the instruction to enter the second location defined mode, the wireless device 122 may be denied access to the network 118 by the PAN device 116. In other words, in order to access the network 118 via the PAN device 116, the wireless device 122 may have to accept the mode change from the first location defined mode to the second location defined mode. Again, in the interest of security, if the wireless device 122 does not comply with a remote instruction to disable a camera within the wireless device 122, a security officer may be instructed to confiscate the wireless device 122.

In another aspect of the present disclosure, the movement of the wireless device 122 may be monitored by the communication antenna 124 via a global positioning module within the wireless device 122, by location interpretation based on triangulation between available cellular communications towers and tower location data, or a combination thereof (i.e., assisted GPS). Based on the movement of the wireless device 122, the wireless device 122 may receive instructions from the server 126 via the communication antenna 124 to enter various modes associated with various actual or interpreted GPS coordinates stored in a look-up table in the database 128 coupled to the server 126.

In a particular aspect, a location defined mode, e.g., the first location defined mode or the second location defined mode discussed herein, may define at least one behavior of the wireless device 122 while the wireless device 122 is in proximity to the location 102 or the associated the network device 110. The at least one behavior of the wireless device 122 may be a theme, a ringtone, a ringtone volume, a vibrate setting, an alert volume, an instant messaging presence, a message received setting, a call routing setting (i.e., routing certain calls directly to voice mail while at work or home), a chat handling setting (i.e., routing chats to ear piece), a connectivity setting (e.g., Bluetooth, OFDM/OFDMA, WiFi, wireless access, etc.), a buddy list, a button press volume, an alarm volume, a text alert volume, a screen saver, a display background, a wallpaper, or any combination thereof. In another aspect, the location defined mode may be defined by the location, by the user of the wireless device, a community, or a combination thereof.

The location defined mode may also be a gaming mode in which a user is prompted to join a game in progress between a group of users within the location 102. A user entering a particular location may be prompted to accept settings that would make the user a player in a real world game in progress in the location 102. The user may be prompted to share a nickname, an avatar, a character, other information relevant to the game, or a combination thereof. Further, during the exchange between the wireless device 122 and the location 102, e.g., via the network device 110, the user may receive automatic assignment to a team, automatic affiliation with a team or other player, automatic assignment of a fighting class, etc. Also, the user may receive assignments, task, gear, badges, uniforms, etc. Moreover, the location defined mode may include pushing a particular song, songs, portions of a song, or a combination thereof.

The location defined mode may also be an advertising mode in which the location defined mode causes the wireless device 122 to display advertisements or "specials" related to a particular business, or location, in which the wireless device 122 is brought into proximity of by a user. For example, when a user is "window shopping," the location 102 may push advertisements to the wireless device 122.

Figure 2:
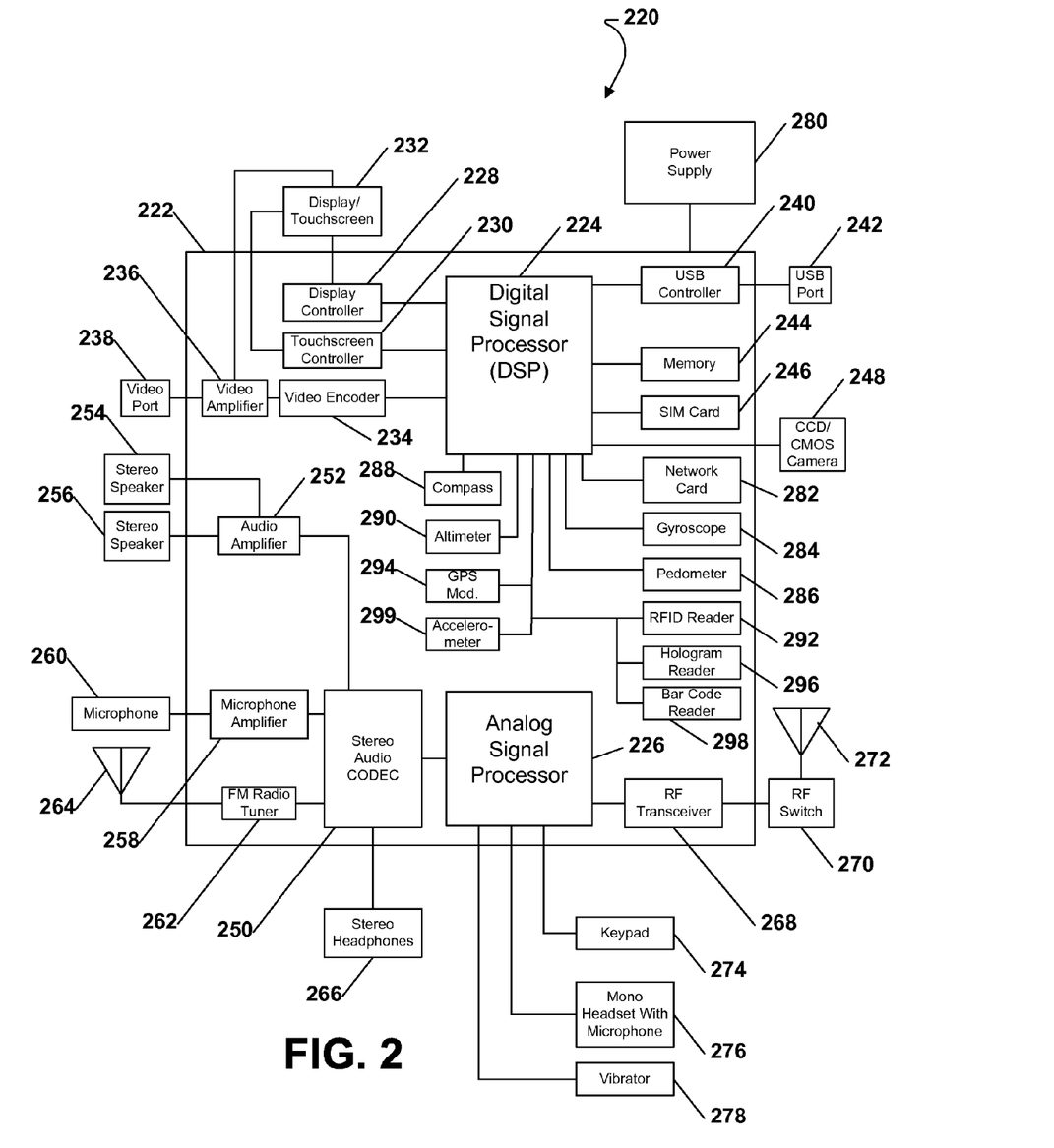
FIG. 2 is a diagram of a first wireless device, according to one aspect.

Referring to FIG. 2, according to one aspect, an exemplary, non-limiting aspect of a wireless device is shown and is generally designated 220. As shown, the wireless device 220 includes an on-chip system 222 that includes a digital signal processor 224 and an analog signal processor 226 that are coupled together. As illustrated in FIG. 2, a display controller 228 and a touchscreen controller 230 are coupled to the digital signal processor 224. In turn, a touchscreen display 232 external to the on-chip system 222 is coupled to the display controller 228 and the touchscreen controller 230.

FIG. 2 further indicates that a video encoder 234, e.g., a phase alternating line (PAL) encoder, a sequential couleur a memoire (SECAM) encoder, or a national television system(s) committee (NTSC) encoder, is coupled to the digital signal processor 224. Further, a video amplifier 236 is coupled to the video encoder 234 and the touchscreen display 232. Also, a video port 238 is coupled to the video amplifier 236. As depicted in FIG. 2, a universal serial bus (USB) controller 240 is coupled to the digital signal processor 224. Also, a USB port 242 is coupled to the USB controller 240. A memory 244 and a subscriber identity module (SIM) card 246 may also be coupled to the digital signal processor 224. Further, as shown in FIG. 2, a digital camera 248 may be coupled to the digital signal processor 224. In an exemplary aspect, the digital camera 248 is a charge-coupled device (CCD) camera or a complementary metal-oxide semiconductor (CMOS) camera.

As further illustrated in FIG. 2, a stereo audio CODEC 250 may be coupled to the analog signal processor 226. Moreover, an audio amplifier 252 may coupled to the stereo audio CODEC 250. In an exemplary aspect, a first stereo speaker 254 and a second stereo speaker 256 are coupled to the audio amplifier 252. FIG. 2 shows that a microphone amplifier 258 may be also coupled to the stereo audio CODEC 250. Additionally, a microphone 260 may be coupled to the microphone amplifier 258. In a particular aspect, a frequency modulation (FM) radio tuner 262 may be coupled to the stereo audio CODEC 250. An amplitude modulation (AM) radio tuner (not shown) may also be included in the on-chip system 222. Also, an FM antenna 264 is coupled to the FM radio tuner 262. Further, stereo headphones 266 may be coupled to the stereo audio CODEC 250.

In a particular aspect, a location may automatically adjust settings that are associated with one of the elements discussed above. For example, a location, e.g., a stadium, may push an FM tuning setting, or AM tuning setting, to the wireless device 220 in order to point fans to broadcasted play-by-play information or in the event of an emergency, to hear emergency information including pending weather conditions and evacuation information. Also, a location, e.g., an airport, a train station, or a bus station, may push an FM tuning setting or AM tuning setting to the wireless device 220 in order to point travelers to relevant information regarding the location, e.g., delays, weather, shut downs, cancellations, etc. A location, e.g., an airplane, a jet, a train, or a bus, may also push a tuning setting to the wireless device 220 in order to allow the user to hear information regarding arrival times, upcoming station stops, etc. Further, a location may push a volume setting that may lower the volume of the wireless device 220, e.g., to allow a user to hear an announcement that is made over a public address (PA) system. In addition to FM tuning settings or AM tuning settings, the location may push Internet broadcast settings (i.e., for Internet streaming radio) to the wireless device 220 and a browser within the wireless device 220 may be re-directed to an Internet address associated with the Internet broadcast settings. Moreover, in the event that the wireless device 220 is configured to receive satellite radio, the location may push a satellite radio setting to the wireless device 220.

FIG. 2 further indicates that a radio frequency (RF) transceiver 268 may be coupled to the analog signal processor 226. An RF switch 270 may be coupled to the RF transceiver 268 and an RF antenna 272. As shown in FIG. 2, a keypad 274 may be coupled to the analog signal processor 226. Additionally, a mono headset with a microphone 276 may be coupled to the analog signal processor 226. Further, a vibrator device 278 may be coupled to the analog signal processor 226. FIG. 2 further shows that a power supply 280 may be coupled to the on-chip system 222. In a particular aspect, the power supply 280 is a direct current (DC) power supply that provides power to the various components of the wireless device 220 that require power. Further, in a particular aspect, the power supply is a rechargeable DC battery or a DC power supply that is derived from an alternating current (AC) to DC transformer that is connected to an AC power source. In the case of a rechargeable DC battery, a location may push an invitation to accept wireless power charging and the appropriate settings.

FIG. 2 further shows that the wireless device 220 may also include a network card 282 that may be used to access a data network, e.g., a local area network, a personal area network, or any other network. The network card 282 may be a Bluetooth network card, a WiFi network card, a personal area network (PAN) card, a personal area network ultra-low-power technology (PeANUT) network card, or any other network card well known in the art. Further, the network card 282 may be incorporated into a chip, i.e., the network card 282 may be a full solution in a chip, and may not be a separate network card 282. The wireless device 220 may also include a gyroscope 284, a pedometer 286, a compass 288 and an altimeter 290. In a particular aspect, the compass 288 may be a digital compass such as a magnetometer. The gyroscope 284, the pedometer 286, the compass 288, and the altimeter 290 may be used to monitor movement of the wireless device 220 in order to establish the location of the wireless device 220, e.g., within a building or other location. In other words, the gyroscope 284, the pedometer 286, the compass 288, and the altimeter 290 may provide a means for locating the wireless device. As shown in FIG. 2, the wireless device 220 may also include a RFID reader 292. The RFID reader 292 may be used to recognize RFID tags when the RFID tags come into range of the wireless device 220 and the RFID reader 292. As described herein, the RFID tags may provide instructions for the wireless device 220 to change modes.

In a particular aspect, the wireless device 220 may further include a global positioning system (GPS) module 294 that may be couple coupled to the DSP 224 or the analog signal processor 226. The GPS module 294 and at least one of the processors 224, 226 may provide a means for locating the wireless device 220 either alone or in conjunction with network information available to the wireless device 220, e.g., using a table available to the GPS module 294 via a wireless network. The wireless device 220 may also include a hologram reader 296 and a bar code reader 298. The hologram reader 296 and the bar code reader 298 may be used to recognize holograms or bar codes strategically placed in various locations and upon recognition of particular holograms or bar codes, the wireless device 220 may be instructed to change modes according to the locations associated with particular holograms or bar codes.

FIG. 2 further indicates that the wireless device 220 may include an accelerometer 299 that may be coupled to the DSP 224. The accelerometer 299 may be used to determine direction of motion of the wireless device 220 and may further be used to determine a location of the wireless device 220 with more accuracy within a location. In other words, the accelerometer 299 may also serve as a means for locating the wireless device 220 within a building at least partially based on a previously noted location of the wireless device 220. The accelerometer 299 may also be used to determine a rate of motion either within a small space, e.g., moving the wireless device 220 from a pocket to an ear, or within a large space, e.g., walking, running, ascending stairs, descending stairs, or a combination thereof. Further, the accelerometer 299 in conjunction with the gyroscope may serve as a means for determining an orientation of the wireless device 220.

As depicted in FIG. 2, the touchscreen display 232, the video port 238, the USB port 242, the camera 248, the first stereo speaker 254, the second stereo speaker 256, the microphone 260, the FM antenna 264, the stereo headphones 266, the RF switch 270, the RF antenna 272, the keypad 274, the mono headset 276, the vibrator 278, and the power supply 280 are external to the on-chip system 222.

Figure 3:
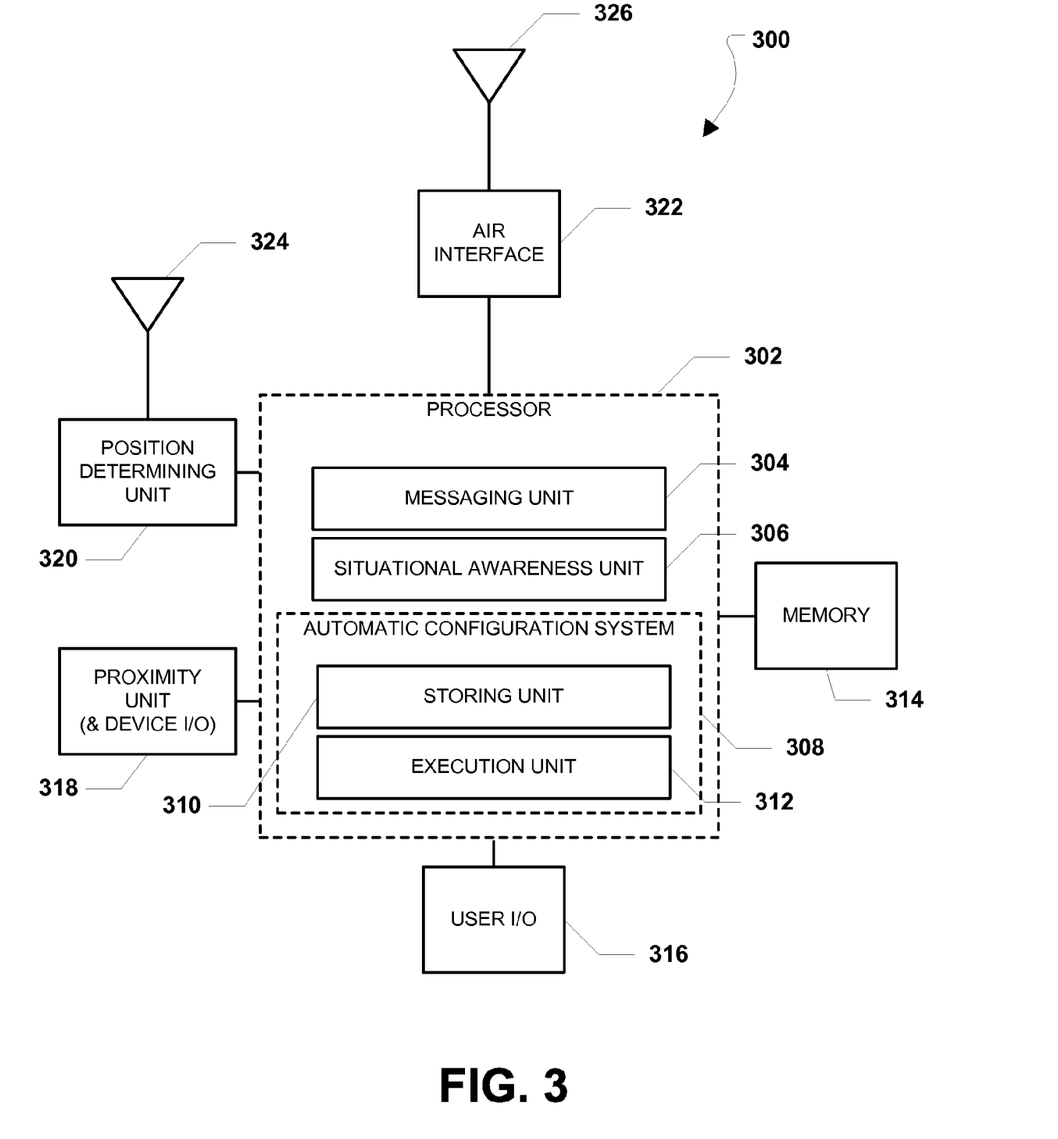
FIG. 3 is a diagram of a second wireless device, according to one aspect.

FIG. 3 illustrates a second wireless device that is designated 300. As shown, the second wireless device 300 may include a process 302. The processor 302 may include a messaging unit 304 and a situational awareness unit 306. Further, the processor 302 may include an automatic configuration system 308 that, in turn, may include a storing unit 310 and an execution unit 312. The wireless device 300 may also include a memory 314 and a user input/output 316 that may be coupled to the processor 302. The user input/output 316 may include a keypad in conjunction with a display screen.

As illustrated in FIG. 3, the wireless device 300 may further include a proximity unit 318 that may include a device input/output. Further, the wireless device 300 may include a position determining unit 320 and an air interface 322. The position determining unit 320 may be coupled to a transceiver 324, e.g., an antenna. The air interface 322 may also include a transceiver 324, e.g., an antenna. In a particular aspect, the wireless device 300 may interact with the system, described above, in order to change operational modes associated with the wireless device 300 and various locations in which the wireless device 300 may be located.

The proximity unit 318 may be used with different types of radio frequency (RF) base station/pairing associations in smaller areas, e.g., RFID, 802.11 and common SSID names, Bluetooth PANs, and any other base stations/pairing locations. The proximity unit 318 in conjunction with location code tags, RFID tags, various network devices, or a combination thereof may serve as identification mechanisms for the presence of the wireless device 300 in particular locations, or geographical areas, in order for the wireless device 300 to take appropriate actions prescribed by the automatic configuration system 308.

In a particular aspect, the execution unit 312 within the automatic configuration system 308 may monitor the position of the wireless device 300. When the wireless device 300 enters a saved position, or if the wireless device 300 encounters a position defined by a position definition service (i.e., a shared saved position), the wireless device 300 may prompt a user to approve a location defined mode that is pushed to the wireless device 300 by the location, e.g., by one of the means described herein.

When the wireless device 300 is within a location, such as a business establishment, or within a particular proximity to the location, other actions could be taken independent of the shared saved positions. For example, particular location defined modes, defined as critical or required, may be handled automatically without opportunity for user intervention or input. For example, a trigger may be sent to the proximity unit 318 via Bluetooth, or some other over-the-air interface, when the user enters a movie theatre and the trigger may force the wireless device 300 to migrate to a silent mode—if the wireless device 300 is configured to properly handle the trigger.

The position determining unit 320 may be used to determine a location of the wireless device 300. In a non-limiting, exemplary aspect, the position determining unit 320 may be used in conjunction with GPS technologies and non-GPS technologies. For example, the position determining unit 320 may be used in conjunction with assisted GPS including operator-based base station almanacs and relevant triangulation and cell-tower ID solutions that may use cell tower IDs and self-populated databases based on GPS/cell-tower ID correlation. As the location of the wireless device 300 changes, the operational mode of the wireless device 300 may also change based on the determined locations.

Additionally, the automatic configuration system 308 may be used to automatically configure the wireless device 300 and the various location defined modes associated with the wireless device 300 and the locations in which the wireless device 300 may enter. For example, in the case of location code tags, the automatic configuration system 308, e.g., the storing unit 310 therein, may be used to store a particular location code tag and a particular location defined mode associated therewith in a look-up table in the memory 314. Later, upon recognition of particular location code tags, the execution unit 312 may be used to identify particular location code tags, retrieve location defined modes from the lookup table, and instruct the wireless device 300 to enter particular location defined modes as desired.

In a particular aspect, the messaging unit 304 may communicate with the position definition service, described above in conjunction with FIG. 1. The messaging unit 304 may send latitude and longitude information, or other location information, that may be retrieved from the situational awareness unit 306. The messaging unit 304 may transmit the location information on a periodic basis, when prompted by the position definition service, when prompted by the situational awareness unit 306, or a combination thereof. Alternatively, the exchange between the messaging unit 304 and the position definition service may be based on membership to a current zone, e.g., membership to a particular chain of retailers wherein the zone includes the location of all stores belonging to the retailer. In response to the location information, the messaging unit 304 may receive defined actions, e.g., placing the wireless device in a sleep mode, prompting the user for manner mode, etc. Further, the messaging unit 304 may receive additional information from the positioning definition service such as a zone size, etc.

In another aspect, the messaging unit 304 may be used to transmit similar information peer-to-peer via SMS/MMS in the event another wireless device is similarly configured, via hardware, via software, or a combination thereof, and initiates the sharing of information. In such a case, the situational awareness unit 306 may be bypassed. Such an example may enable viral, peer-to-peer sharing of genre/location information between wireless devices, users, or a combination thereof. In a particular aspect, the messaging unit 304 may also handle publishing, or otherwise sharing, of zones, genres, and related information to the position determining service as prompted through the user I/O and wireless device software. As described herein, a similar messaging unit exists within the position definition service.

In another aspect, the situational awareness unit 306 may provide the wireless device with additional situational awareness for use by the automatic configuration system 310 through the cross-referencing of the output of the position determining unit 320, the proximity unit 318, or a combination thereof, with pre-cached genres or genres/definitions available through a service the wireless device communicates with, e.g., the position definition service.

For example, genres may be selected by the user in a method similar to that of setting zone radiuses. However, the user may be prompted for a pre-defined profile to be used for that genre. Genres may be automatically and intelligently based on other available information, e.g., calendar-defined 'work hours', event category classifications (work, personal, important, etc.), etc. The genres may be pre-defined with logical definitions, e.g., explicit ringtones should not be played in work environments. The genres may also interpret other types of content classifications and perform resulting logical actions, as appropriate as well as be updated over-the-air from the position definition service.

The situational awareness unit 306 may also include the capability, based on historical latitude/longitude/altitude information, or other location or movement information, to determine an average rate of speed that the wireless device is travelling. When the average rate of speed is cross-referenced with, or otherwise compared to, the size of a particular zone, the situational awareness unit 306 may dynamically update the frequency at which the messaging unit 304 should communicate with the position definition service. The situational awareness unit 306 may also maintain historical information with respect to actions taken when the wireless device 300 is within particular locations. Upon return to previously encountered locations, the situational awareness unit 306 may prompt a user of the wireless device 300 to determine whether the user desires to re-apply a previous action, e.g., a switch to a silent mode. The situational awareness unit 306 may be determine what location and situation the wireless device has encountered and the situational awareness unit 306 may present, apply, or a combination thereof, the appropriate actions as such.

Figure 4:
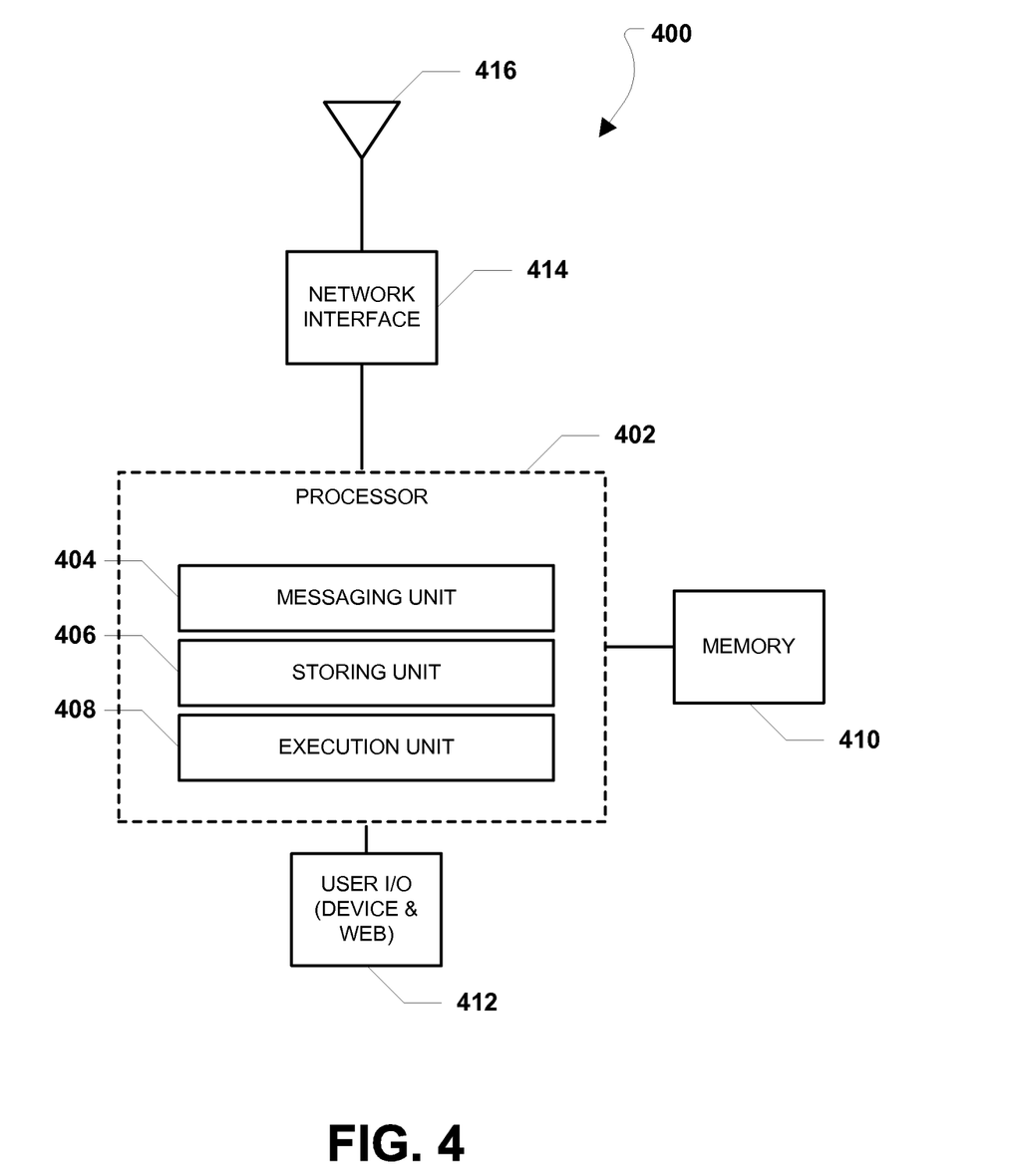
FIG. 4 is a diagram of a third wireless device, according to one aspect.

Referring to FIG. 4, a third wireless device is shown and is generally designated 400. As shown in FIG. 4, the third wireless device 400 may include a processor 402. The processor 404 may include a messaging unit 404, a storing unit 406, and an execution unit 408. Further, the wireless device 400 may include a memory 410 that is coupled to the processor 402. Further, the wireless device 400 may include a user input/output device 412, e.g., a keypad and display, that may be used to operate the wireless device 400 and access various networks, e.g., a wide area network (WAN) (i.e., the Internet), a local area network (LAN), or any combination thereof. The wireless device 400 may also include a network interface 414 coupled to the processor and a transceiver coupled to the network interface 414.

The storing unit 406 may be used to manually configure the wireless device 400 with various locations and associated with location defined modes. The various locations and the location defined modes may be stored in a look-up table in the memory. Thereafter, the execution unit 408 may be used to change the mode of the wireless device 400 as the wireless device 400 enters, or leaves, various locations.

Figure 5:
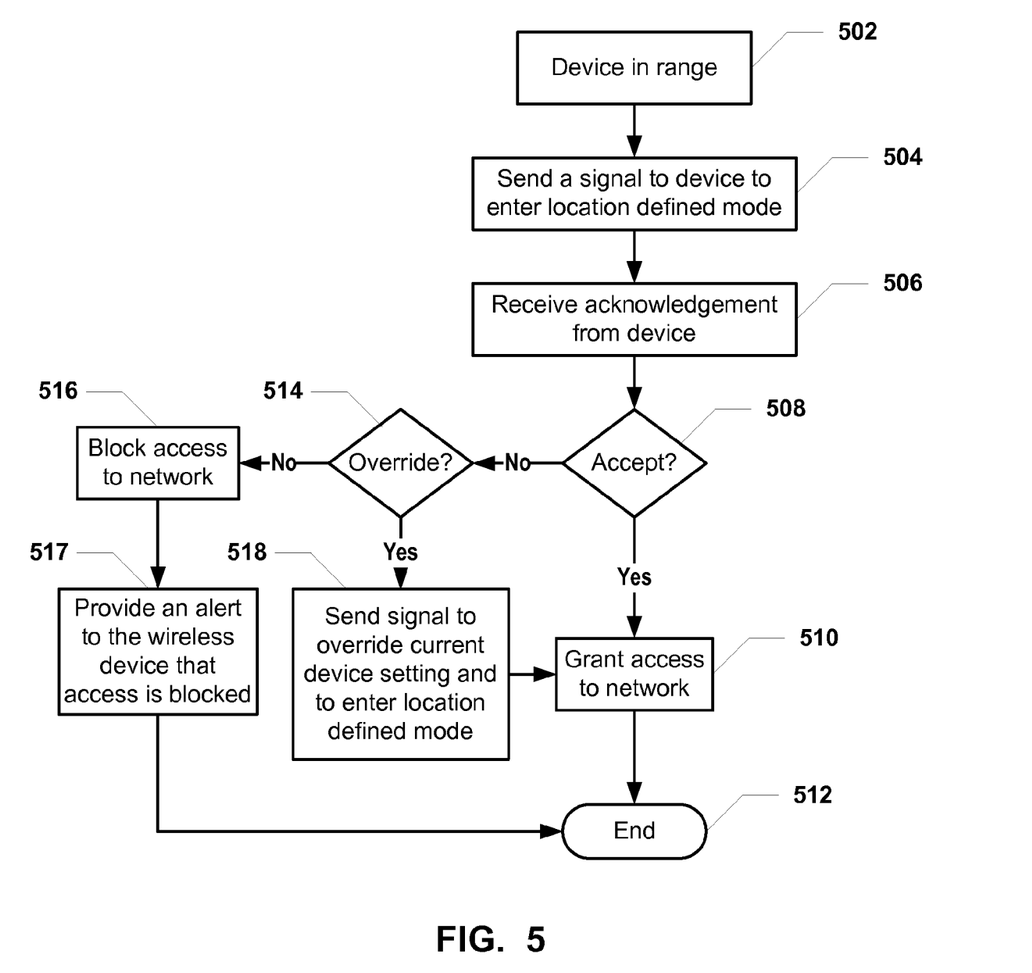
FIG. 5 is a flowchart illustrating a method of providing mode changes to wireless devices, according to one aspect.

Referring now to FIG. 5, according to one aspect, a method of providing mode changes to wireless devices is shown and commences at block 502. In a particular aspect, the method may be performed by a network device, e.g., a peer network device, an infrastructure network device, a microprocessor connected to a peer network device or an infrastructure network device, or a combination thereof. Further, in a particular aspect, a wireless device may connect with a peer or an infrastructure network device via a wireless connection, via a wired connection, or via a combination thereof.

At block 502, a wireless device comes into range of a peer or an infrastructure network device, or attempts to connect to a network device. At block 504, a signal may be sent to the wireless device to enter a location defined mode. Moving to block 506, an acknowledgement may be received from the wireless device.

Next, at 508, it may be determined whether the wireless device has accepted the signal, or "push," to enter the location defined mode. If yes, the method may move to block 510 and access to a network provided by the peer or the network device may be granted. Thereafter, the method may end at state 512.

Returning to 508, if the acknowledgement from the device does not accept the signal to enter the location defined mode, the method may proceed to 514. At 514, it may be determined whether to override the denial of the wireless device to enter the location defined mode. If not, the method may proceed to block 516 and access to the network by the wireless device may be blocked. At block 517, an alert may be provided, or otherwise transmitted, to the wireless device that access to the network device is blocked and that no further action is required by the wireless device. Then, the method may end at state 512.

Returning to 514, if the peer or the infrastructure network device decides to override the denial of the wireless device to enter the location defined mode, the method may continue to block 518. At block 518, the peer or the infrastructure network device, or the microprocessor connected thereto, may send a signal to the wireless device to override the current device settings and force the wireless device to enter the location defined mode. Thereafter, the method may proceed to block 510 and continue as described herein.

This method may allow a particular location to define how wireless devices are to behave when the wireless devices are brought into the particular location. For example, a theater may desire that patrons visiting the theater turn their wireless devices to a silent mode so that the wireless devices will not make noise within the theater during a movie, e.g., due to an incoming call, incoming text, button press, alarm, reminder, etc.

Additionally, as required by the Federal Aviation Authority, passengers on aircraft may be required to turn their wireless devices off, or place them in a standalone mode, upon entering an aircraft. This method may allow aircraft to automatically cause every network enabled wireless device to enter into an airplane mode in which the wireless devices may not transmit or receive signals that may potentially interfere with the operation of the aircraft.

Further, in another aspect, many hospitals have regulations that require patients, visitors, or other persons, to turn-off their wireless devices in certain areas of the hospital to prevent the wireless devices from potentially interfering with the operation of sensitive equipment within the hospital. This method may allow a hospital to automatically shut down a wireless device, or place the wireless device into a mode that will not allow signal transmission or reception upon entrance into sensitive areas of the hospital.

In another aspect, a location may be a home or office of a user and the home or office may have particular home or office defined modes and the wireless device may be automatically placed in a particular mode upon entering the home or office or particular rooms within the home or office. For example, a user with a new baby may not want his or her wireless device to emit any audible sounds when the wireless device is located within the baby's room. As such, the user may set up an RFID tag, or other means, as described herein, within the baby's room with an instruction to place all wireless devices in silent mode upon entering the baby's room and recognizing the RFID tag. Further, a user may not want any audible tones interrupting meetings at an office. As such, the user may set up an RFID tag, or other means, as described herein, within a conference room that will cause all wireless devices that enter the conference room to switch to a silent mode upon entering the conference room.

Figure 6:
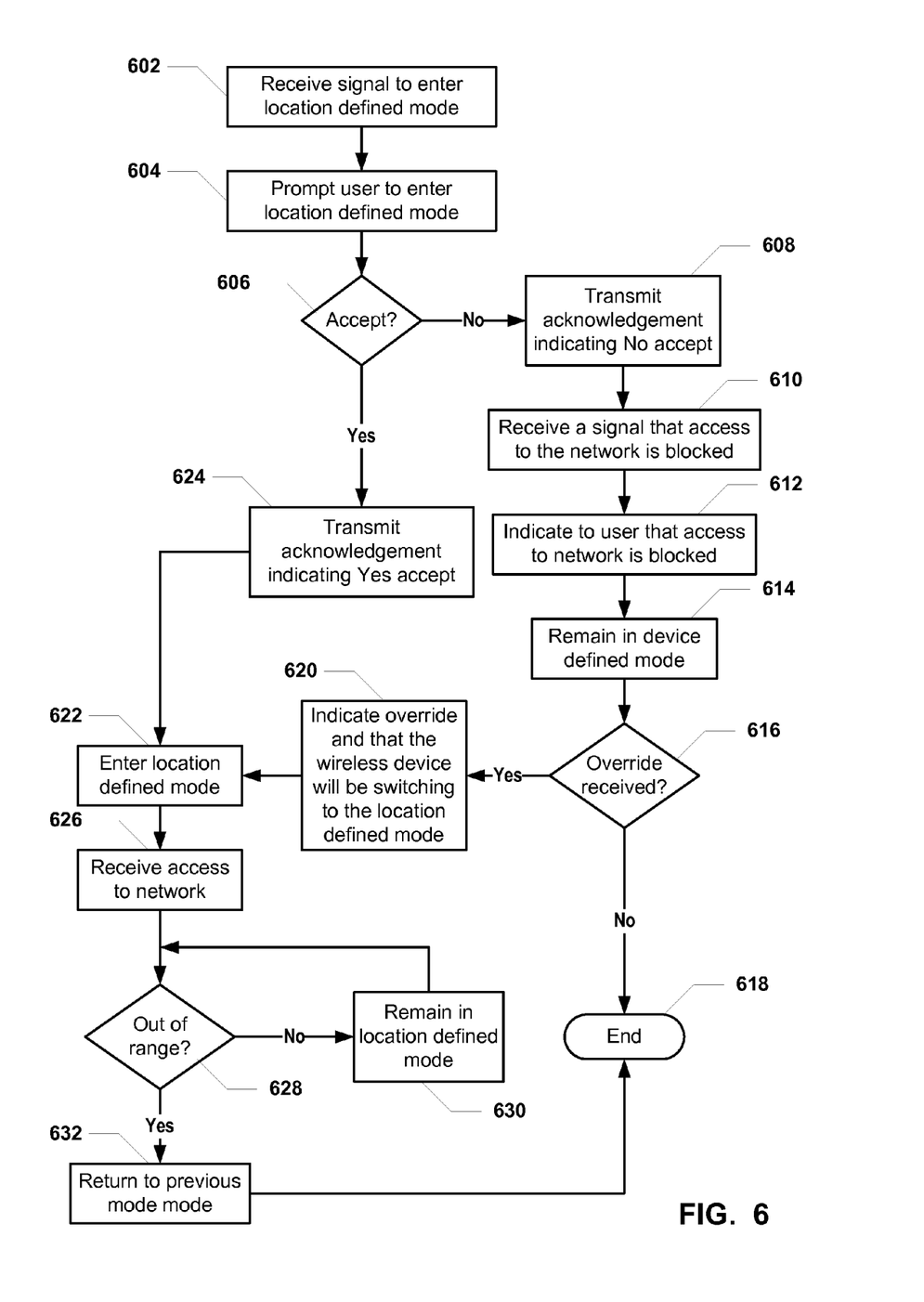
FIG. 6 is a flowchart illustrating a first method of receiving mode changes at wireless devices, according to one aspect.

Referring now to FIG. 6, in accordance with one implementation, a first method of receiving mode changes at wireless devices is depicted and commences at block 602. At block 602, the wireless device may receive a signal instructing the wireless device to enter a location defined mode. In a particular aspect, the wireless device may receive the signal upon attempting to connect with a network device, e.g., a peer network device, an infrastructure network device, a microprocessor connected to a peer network device or an infrastructure network device, or a combination thereof, located within, or near, the particular location. At block 604, the wireless device may prompt a user, e.g., via a display, to accept the location defined mode. Moving to 606, the wireless device may determine whether the user has accepted the switch to the location defined mode, e.g., based on input received from the user via a keypad.

If the user does not accept the switch to the location defined mode, the method may proceed to block 608 and the wireless device may transmit an acknowledgement indicating that the wireless device is not accepting the switch to the location defined mode. Moving to block 610, the wireless device may receive a signal indicating that access to the network via the network device is blocked. Next, at block 612, the wireless device may indicate to the user that access to the network via the network device is blocked. Further, at block 614, the wireless device may remain in the device defined mode.

Continuing to 616, the wireless device may determine whether an override is received. If not, the method may end at block 618. On the other hand, if an override signal is received, the method may move to block 620 and the wireless device may indicate to the user that an override is received and that the wireless device will be switching to the location defined mode. Thereafter, at block 622, the wireless device may enter the location defined mode.

Returning to 606, if the user accepts the location defined mode, the method may proceed to block 624 and the user may transmit an acknowledgement indicating that the wireless device is accepting the location defined mode. Then, at block 622, the wireless device may enter the location defined mode.

Moving to block 626, the wireless device may receive access to a network, via a network device, provided by the location in which the wireless device is located. In another aspect, the wireless device may receive access to a location in which the network device is located. In other words, the wireless device may act as a key in order to unlock physical access to a location for a user associated with the wireless device. At 628, the wireless device may determine whether the wireless device is disconnected, or otherwise out of range, from the network device that transmitted the signal to enter the location defined mode. If the wireless device is not disconnected, the method may proceed to block 630 and the wireless device may remain in the location defined mode. Thereafter, the method may return to 628. When the wireless device is disconnected from the network device, the method may move to block 632 and the wireless device may return to the previous device mode, i.e., the mode in which the wireless device was placed prior to receiving the signal to enter the location defined mode. Thereafter, the method may end at state 618.

Figure 7:
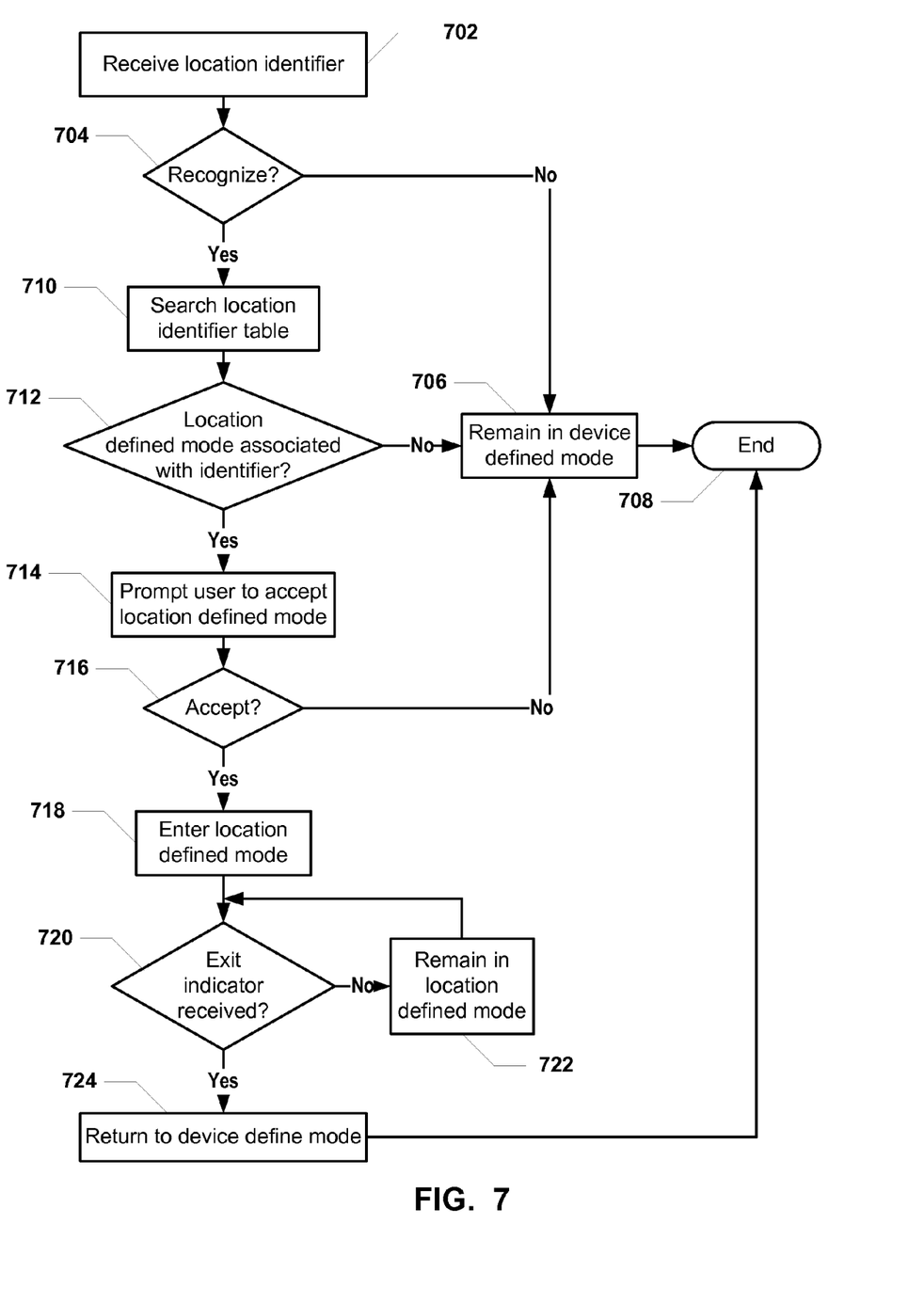
FIG. 7 is a flowchart illustrating a second method of receiving mode changes at wireless devices, according to one aspect.

Referring to FIG. 7, according to one aspect, a second method of receiving mode changes at wireless devices is illustrated and begins at block 702. At block 702, a wireless device may receive a location identifier. The location identifier may be a location code tag, an RFID tag, or a combination thereof. At 704, it may be determined whether the wireless device recognizes the location identifier. If the wireless device does not recognize the location identifier, the method may proceed to block 706 and the wireless device may remain in a device defined mode. Thereafter, the method may end at state 708.

Returning to 704, if the wireless device recognizes the location identifier, the method may proceed to block 710 and the wireless device may search a location identifier look-up table stored within the wireless device. Continuing to 712, the wireless device may determine whether there is a location defined mode associated with the location identifier. If not, the method may move to block 706 and continue as described herein.

Otherwise, the method may move to block 714 and the wireless device may prompt the user accept the location defined mode. Thereafter, at 716, the wireless device may determine whether the user has accepted the location defined mode, e.g., based on an input received from the user via a keypad at the wireless device. If the user does not accept the location defined mode, the method may move to block 706 and continue as described herein. Conversely, if the user does accept the location defined mode, the method may proceed to block 718 and the wireless device may enter the location defined mode. Thereafter, at block 720, the wireless device may determine whether an exit indicator is received from the location. The exit indicator may be another location code tag, another RFID tag, or a combination thereof, placed near an exit of the location. Alternatively, the exit indicator may simply be a second recognition of the location identifier as the user exits the location. In other words, a first recognition of the location identifier toggles the wireless device from a device defined mode to the location defined mode and a second recognition of the location identifier toggles the wireless device from the location defined mode back to the device defined mode. In yet another aspect, the exit indicator may be an out of range indicator, a lack of recognition indicator, or a combination thereof.

At 720, if the exit indicator is not received, the method may move to block 722 and the wireless device may remain in the location defined mode. The method may return to 720 and continue as described herein. If the exit indicator is received, the method may move to block 722 and the wireless device may be returned to the device defined mode. Thereafter, the method may end at state 708.

With the system and methods described herein, wireless device usage appropriate to a given environment is enabled. Further, the risk of creating negative societal perceptions of wireless devices is substantially minimized. Additionally, the system and methods described herein may effectively prevent, or substantially minimize the likelihood of inappropriate content on wireless devices from being displayed or announced at inappropriate times and locations. For example, the system and methods described herein help minimize phones ringing in inappropriate locations such as movie theaters, churches, fine dining establishments, etc. Also, the system and methods described herein may prevent explicit lyrics ringtones from being played in inappropriate locations such as corporate environments. The system and methods described herein may also prevent, or minimize, provocative content, e.g., wallpapers, from being displayed in areas frequented by children. Further, the systems and methods described herein may minimize personal chat (PTT) message bursts on speakerphone in locations where such interruptions may be disruptive or annoying such as in theatres, churches, restaurants, conference rooms, etc. The methods disclosed herein may be provided via a subscription. In other words, a user may opt to pay a fee in order to receive the automatic mode changes. Conversely, a user may pay a fee in order to not receive the automatic mode changes. In another aspect, the service may be offered for free and revenues may be derived from advertisements, ring tone sales, music sales, software downloads, etc.

In a particular aspect, the system and methods described herein may be applicable for nearly any mobile device, i.e., that which is not 'fixed', having an air interface. Automobiles, for instance, may be made to do things based on location awareness, e.g., auto-lightening electrochromatic windows in the presence of a public safety officer/vehicle. Such an example would likely negate the need for bans on auto-front-window tinting. Further, automobile tires may be made that will auto-adjust inflation pressure downward in the presence of cross-referenced storm patterns in order to provide greater traction in the rain. Motorcycles may be made to alert owners when the bike is being stolen due to the bike not being within communication distance of a mobile device. Alarm systems may be provided that automatically arm and disarm when in the presence of authorized entrants. In such a case, mobile devices may be used as authorization tokens that may automatically disarm/arm alarm systems due to proximity to, or distance from, an alarm system. Such a service may be a subscription service for the alarm system, the wireless device, or a combination thereof.

In another aspect, locations may changes what settings it sends to wireless devices depending on the time of day. For example, a house may push a setting to set a wireless telephone to a maximum ringer volume setting during the day, e.g., between 7 am and 11 pm, and then, push a setting to set the wireless telephone on a minimum ringer volume setting, or silent setting, at night. Similarly, a vehicle may push a setting to set a wireless telephone to a maximum ringer volume setting while the vehicle is moving and push a setting to set a wireless telephone to a minimum ringer volume setting while the vehicle is stationary.

It may be appreciated that a computer program, or programs, may comprise the method steps described previously. Further, the computer programs may be executed within a wireless device, a network device (e.g., a peer network device, an infrastructure network device, or a combination thereof), and a microprocessor connected to a network device, or a combination thereof in order to control the operation of the wireless device. The computer program may be stored on a computer-readable medium, i.e., a memory, and packaged as a computer program product.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present disclosure, as defined by the following claims.

What is claimed is:

1. A method of providing mode changes to a wireless device, the method comprising:
   receiving a request from the wireless device to connect with a network device;
   sending a signal to the wireless device to enter a location defined mode;
   determining, at a given network device remote from the wireless device, that the wireless device has entered into the location defined mode; and
   determining, at the given network device, to grant the wireless device access to a network via the network device based on the determination that the wireless device has entered into the location defined mode.

2. The method of claim 1, further comprising:
   receiving an acknowledgement from the wireless device that the wireless device accepts the location defined mode; and
   granting access to the network via the network device in response to the acknowledgment.

3. The method of claim 1, further comprising:
   receiving an acknowledgement from the wireless device that the wireless device does not accept the location defined mode;
   blocking access to the network via the network device in response to the acknowledgment; and
   providing an alert to the wireless device that access to the network is blocked.

4. The method of claim 3, further comprising:
   sending an override signal to the wireless device, wherein the override signal overrides a current device mode and causes the wireless device to enter the location defined mode.

5. The method of claim 4, further comprising:
   granting access to the network based on the wireless device's entry into the location defined mode.

6. The method of claim 1, wherein the location defined mode defines at least one behavior of the wireless device while the wireless device is in proximity to a location associated with the network device.

7. The method of claim 6, wherein the at least one behavior comprises at least one of a theme, a ringtone, a ringtone volume, a vibrate setting, an alert volume, an instant messaging presence, a message received setting, a call routing setting, a chat handling setting, a connectivity setting, a buddy list, a button press volume, an alarm volume, a text alert volume, a screen saver, a display background, a wallpaper, a game setting, or any combination thereof.

8. The method of claim 1, wherein the location defined mode is defined by an owner of the location.

9. The method of claim 1, wherein the location defined mode is defined by a user of the wireless device.

10. The method of claim 1, wherein the location defined mode is defined by a community.

11. A device for providing access to a network, the device comprising:
   means for receiving a request from a wireless device to connect with a network device;
   means for sending a signal to the wireless device to enter a location defined mode;
   means for determining, at a given network device remote from the wireless device, that the wireless device has entered into the location defined mode; and
   means for determining to grant the wireless device access to the network via the network device based on the determination that the wireless device has entered into the location defined mode.

12. The device of claim 11, further comprising:
   means for receiving an acknowledgement from the wireless device that the wireless device accepts the location defined mode; and
   means for granting access to the network via the network device in response to the acknowledgment.

13. The device of claim 11, further comprising:
   means for receiving an acknowledgement from the wireless device that the wireless device does not accept the location defined mode; and
   means for blocking access to the network via the network device in response to the acknowledgment.

14. The device of claim 13, further comprising:
   means for sending an override signal to the wireless device, wherein the override signal overrides a current device mode and causes the wireless device to enter the location defined mode; and
   means for granting access to the network based on the wireless device's entry into the location defined mode.

15. The device of claim 11, wherein the location defined mode defines at least one behavior of the wireless device while the wireless device is in proximity to a location associated with the network device.

16. The device of claim 15, wherein the at least one behavior comprises at least one of a theme, a ringtone, a ringtone volume, a vibrate setting, an alert volume, an instant messaging presence, a message received setting, a call routing setting, a chat handling setting, a connectivity setting, a buddy list, a button press volume, an alarm volume, a text alert volume, a screen saver, a display background, a wallpaper, or any combination thereof.

17. A non-transitory computer-readable medium containing instructions stored thereon, the instructions comprising:
   at least one instruction for causing a computer to receive a request from a wireless device to connect with a network device;
   at least one instruction for causing the computer to send a signal to the wireless device to enter a location defined mode;
   at least one instruction for causing the computer to determine, at a given network device remote from the wireless device, that the wireless device has entered into the location defined mode; and
   at least one instruction for causing the computer to determine to grant the wireless device access to a network via the network device based on the determination that the wireless device has entered into the location defined mode.

18. The non-transitory computer-readable medium of claim 17, further comprising:
   at least one instruction for causing the computer to receive an acknowledgement from the wireless device that the wireless device accepts the location defined mode; and
   at least one instruction for causing the computer to grant access to the network via the network device in response to the acknowledgment.

19. The non-transitory computer-readable medium of claim 17, further comprising:
   at least one instruction for causing the computer to receive an acknowledgement from the wireless device that the wireless device does not accept the location defined mode; and
   at least one instruction for causing the computer to block access to the network via the network device in response to the acknowledgment.

20. The non-transitory computer-readable medium of claim 19, further comprising:
- at least one instruction for causing the computer to send an override signal to the wireless device, wherein the override signal overrides a current device mode and causes the wireless device to enter the location defined mode; and
- at least one instruction for causing the computer to grant access to the network based on the wireless device's entry into the location defined mode.

21. The non-transitory computer-readable medium of claim 17, wherein the location defined mode defines at least one behavior of the wireless device while the wireless device is in proximity to a location associated with the network device.

22. The non-transitory computer-readable medium of claim 21, wherein the at least one behavior comprises at least one of a theme, a ringtone, a ringtone volume, a vibrate setting, an alert volume, an instant messaging presence, a message received setting, a call routing setting, a chat handling setting, a connectivity setting, a buddy list, a button press volume, an alarm volume, a text alert volume, a screen saver, a display background, a wallpaper, or any combination thereof.

23. A device for providing access to a network, the device comprising:
- a processor; and
- a memory accessible to the processor, wherein the memory comprises:
  - at least one instruction for receiving a request from a wireless device to connect with a network device;
  - at least one instruction for sending a signal to the wireless device to enter a location defined mode;
  - at least one instruction for determining, at a given network device remote from the wireless device, that the wireless device has entered into the location defined mode; and
  - at least one instruction for determining to grant the wireless device access to the network via the network device based on the determination that the wireless device has entered into the location defined mode.

24. The device of claim 23, wherein the memory further comprises:
- at least one instruction for receiving an acknowledgement from the wireless device that the wireless device accepts the location defined mode; and
- at least one instruction for granting access to the network via the network device in response to the acknowledgment.

25. The device of claim 23, wherein the memory further comprises:
- at least one instruction for receiving an acknowledgement from the wireless device that the wireless device does not accept the location defined mode; and
- at least one instruction for blocking access to the network via the network device in response to the acknowledgment.

26. The device of claim 25, wherein the memory further comprises:
- at least one instruction for sending an override signal to the wireless device, wherein the override signal overrides a current device mode and causes the wireless device to enter the location defined mode; and
- at least one instruction for granting access to the network based on the wireless device's entry into the location defined mode.

27. The device of claim 23, wherein the location defined mode defines at least one behavior of the wireless device while the wireless device is in proximity to a location associated with the network device.

28. The device of claim 27, wherein the at least one behavior comprises at least one of a theme, a ringtone, a ringtone volume, a vibrate setting, an alert volume, an instant messaging presence, a message received setting, a call routing setting, a chat handling setting, a connectivity setting, a buddy list, a button press volume, an alarm volume, a text alert volume, a screen saver, a display background, a wallpaper, or any combination thereof.

29. A method of receiving mode changes at a wireless device, the method comprising:
- attempting to connect with a network device;
- receiving a signal, from the network device, to enter a location defined mode in order gain access to a network via the network device;
- prompting a user to accept the location defined mode;
- transmitting an acknowledgment to the network device that indicates whether the user has accepted the location defined mode;
- entering the location defined mode;
- receiving access to the network via the network device based on the entry into the location defined mode; and
- returning to a previous device mode, in response to the wireless device disconnecting from the network device.

30. The method of claim 29, wherein the acknowledgment indicates that the user accepts the location defined mode, in response to the user accepting the location defined mode.

31. The method of claim 29, wherein the acknowledgment indicates that the user denies the location defined mode, in response to the user not accepting the location defined mode.

32. The method of claim 31, further comprising:
- remaining in a device defined mode instead of entering the location defined mode;
- receiving a signal that access to the network via the network device is blocked based on the wireless device remaining in the device defined mode; and
- receiving an override signal to override the device defined mode,
- wherein the entry of the wireless device into the location defined mode occurs in response to the override signal.

33. A wireless device, comprising:
- means for attempting to connect with a network device;
- means for receiving a signal, from the network device, to enter a location defined mode in order gain access to a network via the network device;
- means for prompting a user to accept the location defined mode;
- means for transmitting an acknowledgment to the network device that indicates whether the user has accepted the location defined mode;
- means for entering the location defined mode;
- means for receiving access to the network via the network device based on the entry into the location defined mode; and
- means for returning to a previous device mode, in response to the wireless device disconnecting from the network device.

34. The wireless device of claim 33, wherein the acknowledgment indicates that the user accepts the location defined mode, in response to the user accepting the location defined mode.

35. The wireless device of claim 33, wherein the acknowledgment indicates that the user denies the location defined mode, in response to the user not accepting the location defined mode.

36. The wireless device of claim 35, further comprising:
means for remaining in a device defined mode instead of entering the location defined mode;
means for receiving a signal that access to the network via the network device is blocked based on the wireless device remaining in the device defined mode; and
means for receiving an override signal to override the device defined mode,
wherein the means for entering enters the location defined mode in response to the override signal.

37. A non-transitory computer-readable medium containing instructions stored thereon, the instructions comprising:
at least one instruction for causing a computer to attempt to connect with a network device;
at least one instruction for causing the computer to receive a signal, from the network device, to enter a location defined mode in order gain access to a network via the network device;
at least one instruction for causing the computer to prompt a user to accept the location defined mode;
at least one instruction for causing the computer to transmit an acknowledgment to the network device that indicates whether the user has accepted the location defined mode;
at least one instruction for causing the computer to enter the location defined mode;
at least one instruction for causing the computer to receive access to the network via the network device based on the entry into the location defined mode; and
at least one instruction for causing the computer to return to a previous device mode, in response to the wireless device disconnecting from the network device.

38. The non-transitory computer-readable medium of claim 37,
wherein the acknowledgment indicates that the user accepts the location defined mode, in response to the user accepting the location defined mode.

39. The non-transitory computer-readable medium of claim 37,
wherein the acknowledgment indicates that the user denies the location defined mode, in response to the user not accepting the location defined mode.

40. The non-transitory computer-readable medium of claim 39, further comprising:
at least one instruction for causing the computer to remain in a device defined mode instead of entering the location defined mode;
at least one instruction for causing the computer to receive a signal that access to the network via the network device is blocked based on the wireless device remaining in the device defined mode; and
at least one instruction for causing the computer to receive an override signal to override the device defined mode,
wherein the at least one instruction for causing the computer to enter the location defined mode causes the computer to enter the location defined mode in response to the override signal.

41. A wireless device, comprising:
a processor; and
a memory accessible to the processor, wherein the memory comprises:
at least one instruction for attempting to connect with a network device;
at least one instruction for receiving a signal, from the network device, to enter a location defined mode in order gain access to a network via the network device;
at least one instruction for prompting a user to accept the location defined mode;
at least one instruction for transmitting an acknowledgment to the network device that indicates whether the user has accepted the location defined mode;
at least one instruction for entering the location defined mode;
at least one instruction receiving access to the network via the network device based on the entry into the location defined mode; and
at least one instruction for returning to a previous device mode, in response to the wireless device disconnecting from the network device.

42. The device of claim 41, wherein the acknowledgment indicates that the user accepts the location defined mode, in response to the user accepting the location defined mode.

43. The device of claim 41, wherein the acknowledgment indicates that the user denies the location defined mode, in response to the user not accepting the location defined mode.

44. A server, comprising:
a messaging unit coupled to a processor, wherein the messaging unit is configured to communicate location information to a position definition service, and wherein the messaging unit is configured to receive at least one location defined mode from the position definition service at least partially based on the location information, wherein the messaging unit is further configured to grant access to a network by a set of wireless devices in response to a determination that the set of wireless devices has entered into a given location defined mode from the at least one location defined mode.

45. The server of claim 44, further comprising:
a proximity unit, wherein the proximity unit is configured to communicate with a location code tag, an RFID tag, or a combination thereof, and wherein the proximity unit is configured to identify a location based at least partially on the location code tag, the RFID tag, or a combination thereof and wherein the proximity unit is configured to cause a given wireless device from the set of wireless devices to selectively switch to the given location defined mode based on the location.

* * * * *